United States Patent
Sakurai

[11] Patent Number: 5,851,496
[45] Date of Patent: Dec. 22, 1998

[54] CATALYTIC DEVICE FOR CLEANING EXHAUST GASES OF AN INTERNAL COMBUSTION ENGINE

[75] Inventor: Kazuhiro Sakurai, Gotenba, Japan

[73] Assignee: Toyota Jidosha Kabushiki Kaisha, Aichi, Japan

[21] Appl. No.: 789,320

[22] Filed: Jan. 23, 1997

[30] Foreign Application Priority Data

Jan. 26, 1996 [JP] Japan .................................. 8-011978
Sep. 27, 1996 [JP] Japan .................................. 8-256287

[51] Int. Cl.$^6$ ....................................................... F01N 3/10
[52] U.S. Cl. .......................... 422/174; 422/179; 422/180; 422/199; 422/221; 422/222; 60/300
[58] Field of Search ..................................... 422/171, 177, 422/179, 180, 174, 199, 222, 221; 60/299, 300; 502/439, 527; 428/116, 593, 594

[56] References Cited

U.S. PATENT DOCUMENTS

| | | | |
|---|---|---|---|
| 3,692,497 | 9/1972 | Keith et al. ............................... | 422/179 |
| 4,278,717 | 7/1981 | Aoyama .................................. | 422/179 |
| 5,079,210 | 1/1992 | Kaji et al. ............................... | 502/439 |
| 5,272,875 | 12/1993 | Kaji ........................................ | 422/179 |
| 5,486,338 | 1/1996 | Ota et al. ............................... | 422/174 |
| 5,501,842 | 3/1996 | Rajnik et al. ........................... | 422/174 |

FOREIGN PATENT DOCUMENTS

| | | |
|---|---|---|
| 5144549A | 6/1993 | Japan . |
| 5187223A | 7/1993 | Japan . |
| 679181A | 3/1994 | Japan . |

Primary Examiner—Hien Tran
Attorney, Agent, or Firm—Kenyon & Kenyon

[57] ABSTRACT

Device for cleaning exhaust gases by a metallic catalyst carrier that is installed in an exhaust gas passage and is contained in a metallic outer cylinder, wherein a structure for absorbing a difference in the thermal expansion between the metallic catalyst carrier and the outer cylinder is realized without causing stress to the metallic catalyst carrier and without requiring strict tolerance in production. A cushioning material made of a heat-resistant wire gauze is arranged between the metallic catalyst carrier and the metallic outer cylinder, and the cushioning material, metallic carrier and metallic outer cylinder are conductively joined. The cushioning material is compressed between the metallic catalyst carrier and the outer cylinder, and the cushioning material is joined to the metallic catalyst carrier and to the outer cylinder. Here, the junction is accomplished locally without overlapping one upon the other in the axial direction of the outer cylinder.

7 Claims, 12 Drawing Sheets

Fig.2
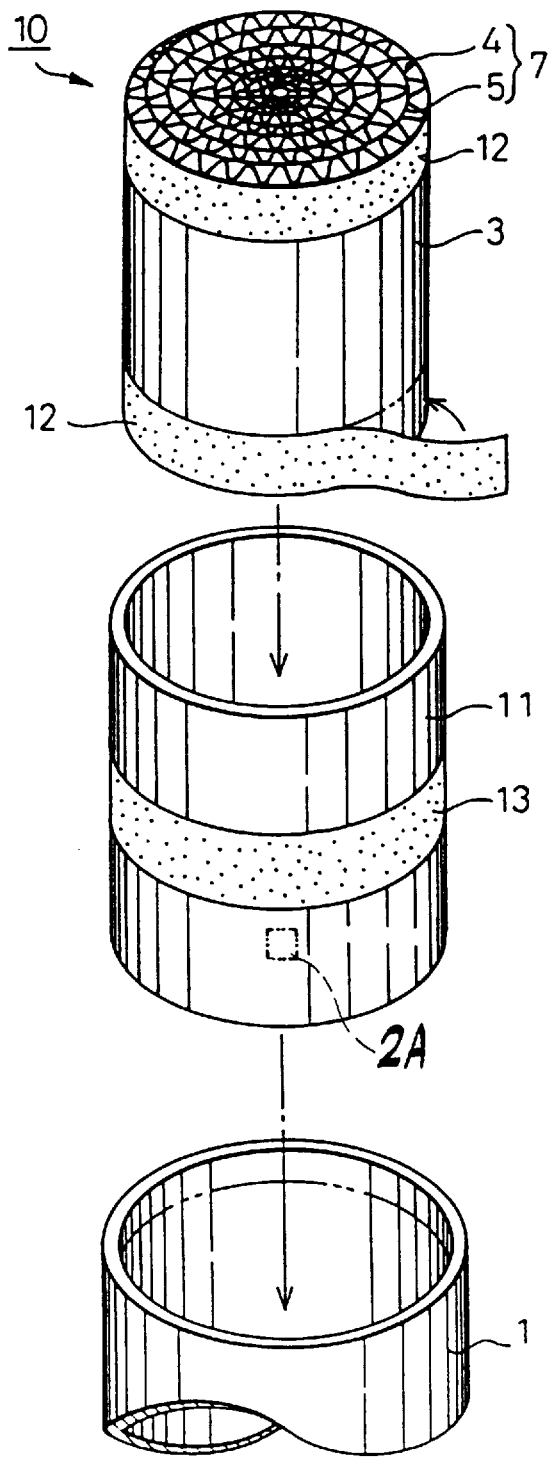
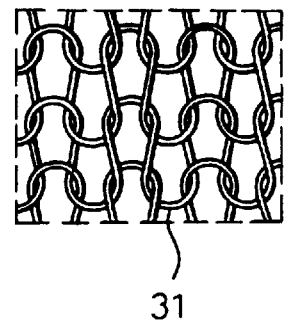
Fig.2A

Fig. 7
Fig. 7A
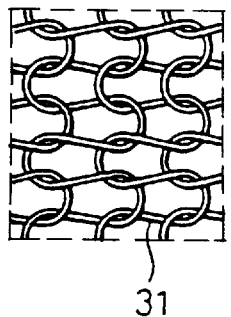
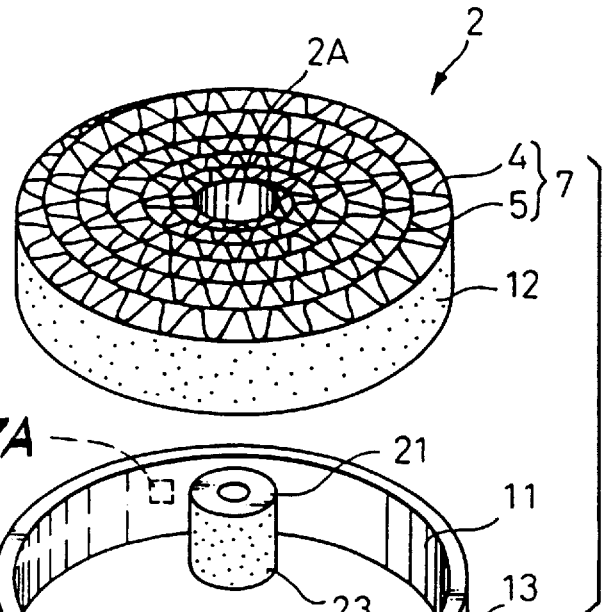
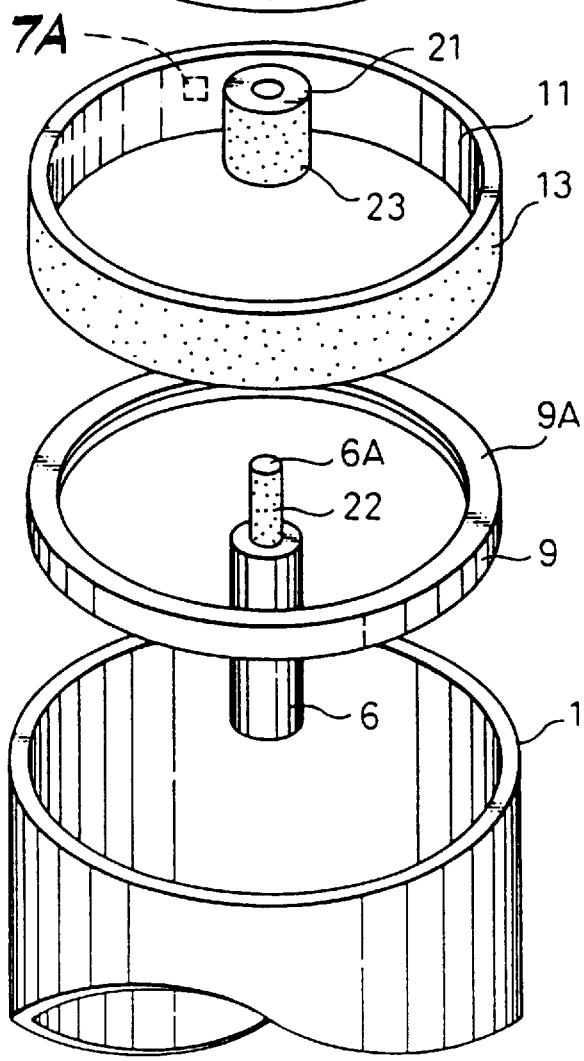

Fig.8
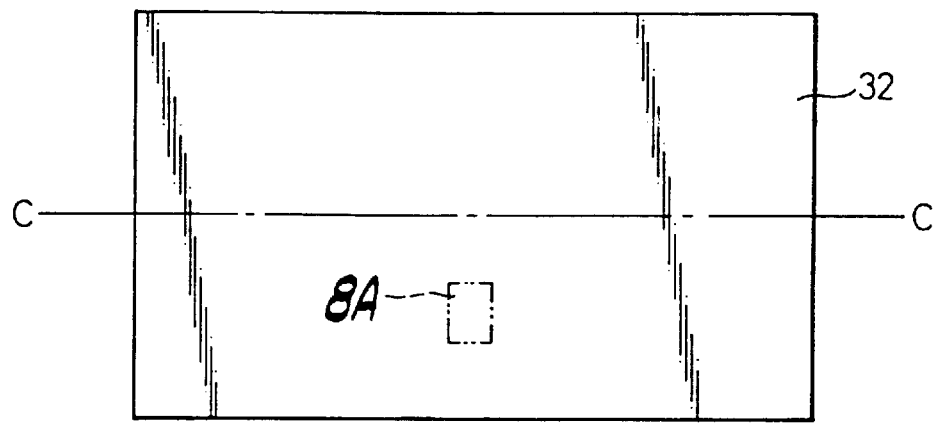
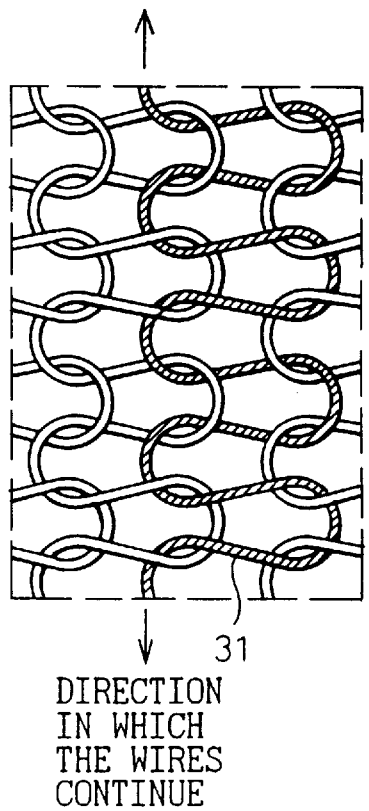
Fig.8A
31
DIRECTION
IN WHICH
THE WIRES
CONTINUE

CATALYTIC DEVICE FOR CLEANING EXHAUST GASES OF AN INTERNAL COMBUSTION ENGINE

BACKGROUND OF THE INVENTION

1. Field of the Invention

The present invention relates to a catalytic device for cleaning exhaust gases of an internal combustion engine and, particularly, to a catalytic device for cleaning exhaust gases of an internal combustion engine using a metallic carrier as a catalyst carrier and having a cushioning material provided between the catalyst carrier and a metallic outer cylinder. More specifically, the invention relates to a catalytic device for cleaning exhaust gases of an internal combustion engine that can also be applied to an electrically heated catalytic device.

2. Description of the Related Art

Exhaust gases emitted from an internal combustion engine of a vehicle contain such harmful substances as HC (hydrocarbons), CO (carbon monoxide) and NOx (nitrogen oxides). A catalytic converter is usually provided in an exhaust passage of an internal combustion engine for removing impurities contained in the exhaust gases. A metallic catalyst carrier (hereinafter referred to as metallic carrier) is often used as a catalyst carrier that is contained in the catalytic converter.

The metallic carrier for the catalyst for cleaning exhaust gases can be, for example, formed by placing a thin flat plate and a thin corrugated plate one upon the other, winding them like a roll to form a honeycomb body. Such a metallic carrier may then be inserted into a metallic outer cylinder as disclosed in, for example, Japanese Unexamined Patent Publication (Kokai) No. 56-4373. In this metallic carrier, the flat plate and corrugated plate of the honeycomb body, and the outer cylinder and the honeycomb body are usually joined integrally together by brazing. In this honeycomb body, a catalyst carrier layer composed of alumina or the like is formed on the surfaces of the honeycomb passages, and a noble metal catalyst is supported on the catalyst carrier layer to form a catalyst for cleaning exhaust gases.

Here, the exhaust gases pass through the honeycomb body at speeds faster in the inner peripheral portions of the honeycomb body than in the outer peripheral portions thereof and, hence, exhaust gases of high temperatures and high speeds come into contact with the inner peripheral portions of the honeycomb body. Furthermore, due to heat generated by the catalytic reaction and emission of heat to the external air from the outer periphery, there occurs such a temperature distribution that the inner peripheral portions of the honeycomb body assume high temperatures and the outer peripheral portions assume temperatures lower than that of the inner peripheral portions. Due to this temperature distribution, the honeycomb body is subjected to thermal stress. As expansion and contraction are repeated due to the thermal stress, the outermost circumferential portion of the honeycomb body may undergo a plastic deformation causing metal fatigue which may break the honeycomb body.

In order to solve such a problem, an intermediate cylinder having a deflecting portion is arranged between a metallic carrier and an outer cylinder that contains the metallic carrier has been proposed in order to absorb a difference in the thermal expansion between the metallic carrier and the outer cylinder (see Japanese Unexamined Patent Publication (Kokai) No. 3-157139).

The above-mentioned construction is capable of absorbing the difference in thermal expansion between the metallic carrier and the outer cylinder but is not capable of absorbing a difference in the thermal expansion between the intermediate cylinder and the metallic carrier. Therefore, the metallic carrier produces thermal stress and loses durability.

Furthermore, the honeycomb body and the intermediate cylinder are inserted in the outer cylinder in a compressed state and are brazed. Here, if the compression margin for the honeycomb body is increased, the honeycomb body is deformed or produces a large stress at the time of assembling. On the other hand, in order to decrease the compression margin for the honeycomb body, fitting tolerances (diameter, precision of circle, precision of cylinder) must be decreased. It therefore becomes necessary to improve dimensional precision of the outer cylinder which is obtained by the plate working, and of the honeycomb body which is obtained by winding a pair of flat foil and corrugated foil in the radial direction, resulting in an increase in the cost of production.

SUMMARY OF THE INVENTION

A first object of the present invention therefore is to provide a catalytic device for cleaning exhaust gases of an internal combustion engine which is capable of absorbing differences between the thermal expansion of a metallic carrier and a cushioning material, between the cushioning material and an outer cylinder, and between the metallic carrier and the outer cylinder by arranging, between the metallic carrier and the outer cylinder, a metallic heat-resistant cushioning material for absorbing a difference in the thermal expansion between the metallic carrier and the outer cylinder without increasing the compression margin of the honeycomb body and without requiring increased dimensional precision of the honeycomb body in the radial direction.

A second object of the present invention is to provide a catalytic device for cleaning exhaust gases of an internal combustion engine which does not permit the occurrence of defective electric conduction when the catalytic device is an electrically heated catalytic device the catalytic device for cleaning exhaust gases of an internal combustion engine being capable of absorbing differences in the thermal expansion between a metallic carrier and a cushioning material, between the cushioning material and an outer cylinder, and between the metallic carrier and the outer cylinder.

The present invention has the following first to tenth aspects.

The first aspect is directed to a catalytic device for cleaning exhaust gases by a metallic carrier that is installed in an exhaust gas passage of an internal combustion engine and is contained in a metallic outer cylinder, wherein a cushioning material made of a heat-resistant wire gauze is disposed between the metallic carrier and the metallic outer cylinder, and the cushioning material and the metallic carrier are joined together, and the cushioning material and the metallic outer cylinder are joined together.

The second aspect is directed to a catalytic device as in the first aspect wherein the junction of the cushioning material and the metallic carrier, and the junction of the cushioning material and the metallic outer cylinder, are accomplished by brazing using brazing materials, and the cushioning material is arranged in a compressed state between the metallic carrier and the metallic outer cylinder.

The third aspect is directed to a catalytic device as in the first or the second aspect wherein the cushioning material and the metallic carrier are locally joined together, and the cushioning material and the metallic outer cylinder are locally joined together.

The fourth aspect is directed to a catalytic device as in the third aspect wherein the locally joined portions are so arranged to not overlap one upon the other in the axial direction of the outer cylinder.

The fifth aspect is directed to a catalytic device as in the first aspect wherein an exhaust gas restriction means for preventing the passage of exhaust gases is provided at an end portion between the metallic carrier and the metallic outer cylinder on the downstream side of the flow of exhaust gases.

The sixth aspect is directed to a catalytic device as in the fifth aspect wherein the exhaust gas restriction means is a retainer which covers the end portion of the cushioning material.

The seventh aspect is directed to a catalytic device as in the fifth aspect wherein the exhaust gas restriction means is an enlarged-diameter portion formed by enlarging the diameter of the metallic outer cylinder so as to contain the cushioning material.

The eighth aspect is directed to a catalytic device as in any of the first to seventh aspects wherein the cushioning material and the metallic carrier, and the cushioning material and the metallic outer cylinder, are joined together maintaining electric conduction, and the metallic carrier is constituted in a manner that the electric power can be supplied thereto to constitute an electrically heated catalyst carrier that can be electrically heated.

The ninth aspect is directed to a catalytic device such as in the eighth aspect wherein at least some of a plurality of metal wires constituting the cushioning material are continuous wires connecting the inner peripheral surface of the cushioning material on the side of the metallic carrier to the outer peripheral surface thereof on the side of the metallic outer cylinder, the continuous wires are evenly arranged over the whole periphery of the cushioning material, and electric conduction is maintained between the inner peripheral surface and the outer peripheral surface of the cushioning material through the continuous wires only.

The tenth aspect is directed to a catalytic device as in the ninth aspect wherein portions near both ends of the continuous wire are positioned on either the inner peripheral surface or the outer peripheral surface of the cushioning material, and a portion near the central portion of the continuous wire is positioned on either the inner peripheral surface or the outer peripheral surface of the cushioning material different from the surface on which the portions near both ends are positioned.

According to the first aspect, the cushioning material in the form of a wire gauze absorbs thermal deformations between the metallic carrier and the outer cylinder in the radial direction, in the circumferential direction and in the axial direction. Therefore, occurrence of thermal stress is avoided among the metallic carrier, cushioning material and outer cylinder.

According to the second aspect, the portions joined with the brazing materials are depressed by the repulsive force of the cushioning material that is arranged in a compressed state and, hence, an increased junction force is exhibited.

According to the third and fourth aspects, the cushioning material is locally joined together in a manner that the locally joined portions will not overlap one upon the other. Therefore, a large space is provided for the metallic carrier that is thermally deformed to escape, and occurrence of thermal stress is further suppressed.

According to the fifth aspect, the exhaust gas restriction means is provided at an end portion between the metallic carrier and the outer cylinder on the downstream side of exhaust gases to prevent the passage of exhaust gases that have not been cleaned.

According to the sixth aspect, the exhaust gas restriction means is simply a retainer covering the end portion of the cushioning material. Therefore, passage of uncleaned exhaust gases is prevented by a simple structure for which only one part is additionally used.

According to the seventh aspect, the exhaust gas restriction means is provided by enlarging the diameter of the outer cylinder. Therefore, a metallic carrier having an increased capacity can be used, and the exhaust gases are prevented from flowing into the cushioning material.

According to the eighth aspect, the cushioning material has electrically conducting property and can be adapted even to an electrically heated catalyst that can be electrically and forcibly heated without changing other portions, making it possible to expand the range of employment.

According to the ninth aspect, the cushioning material contain many continuous wires connecting the inner peripheral surface on the side of the metal carrier to the outer peripheral surface thereof on the side of the metallic outer cylinder. Therefore, even when the individual wires are insulated from each other due to an oxide film formed by exhaust gases on the surfaces of the wires constituting the cushioning material, electric conduction is maintained between the inner peripheral surface of the cushioning material and the outer peripheral surface thereof, avoiding the occurrence of defective conduction.

According to the tenth aspect, a continuous wire in the ninth aspect works as two continuous wires to connect the inner peripheral surface of the cushioning material to the outer peripheral surface thereof, making it possible to decrease the resistance between the inner peripheral surface and the outer peripheral surface of the cushioning material.

BRIEF DESCRIPTION OF THE DRAWINGS

The present invention will be more clearly understood from the description set forth below with reference to the accompanying drawings, wherein:

FIG. 2 is a perspective view of an assembly in which the metallic carrier is contained, via a cushioning material, in an outer cylinder of the catalytic device for cleaning exhaust gases of an internal combustion engine shown in FIG. 1A;

FIG. 7 is a perspective view of an assembly in which a metallic carrier is contained, via a retainer and a cushioning material, in an outer cylinder of the catalytic device for cleaning exhaust gases of an internal combustion engine of the fourth embodiment of the present invention;

FIG. 8 is a plan view illustrating a state of before working a heat-resistant wire gauze that is used for forming the cushioning material of the fourth embodiment;

DESCRIPTION OF THE PREFERRED EMBODIMENTS

The present invention will now be described in detail by way of concrete embodiments in conjunction with the accompanying drawings.

Figure 1A:
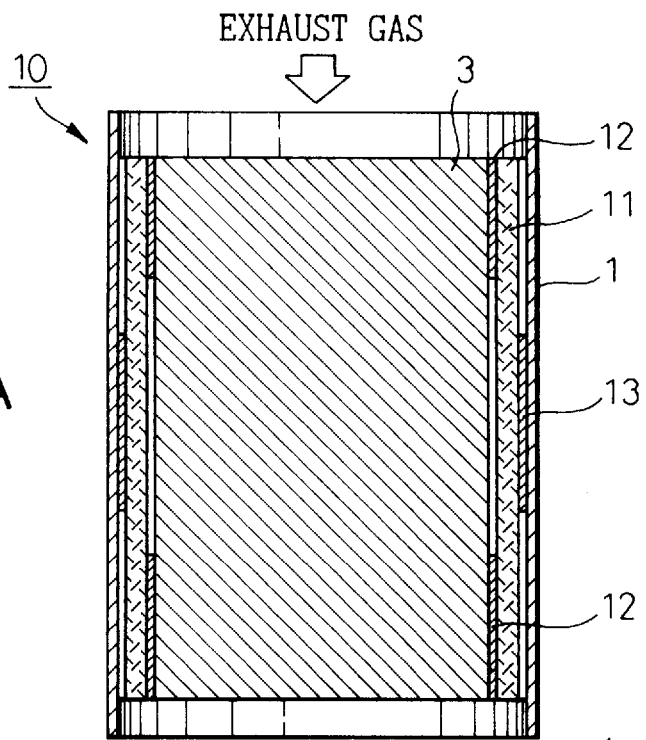
FIG. 1A is a sectional view of a catalytic device for cleaning exhaust gases of an internal combustion engine according to a first embodiment of the present invention, using a metallic carrier as a catalyst.

FIG. 1A is a sectional view of a catalytic device 10 for cleaning exhaust gases of an internal combustion engine according to a first embodiment of the present invention. The catalytic device 10 for cleaning exhaust gases of this embodiment contains a metallic carrier 3 inside a cylindrical casing 1 which is an outer cylinder via a cushioning material 11. The outer peripheral portion of the metallic carrier 3 and the inner peripheral portion of the cushioning material 11 are locally coupled together using a brazing material 12. Furthermore, the outer peripheral portion of the cushioning material 11 and the inner peripheral portion of the casing 1 are locally coupled together using a brazing material 13.

Figure 1B:
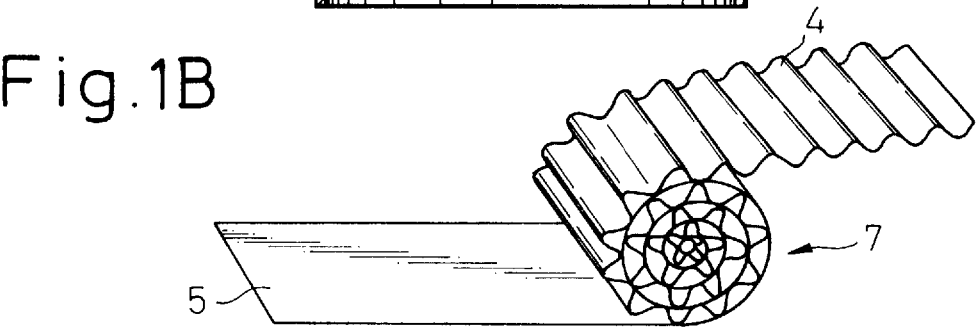
FIG. 1B is a view illustrating a step of producing the metallic carrier of FIG. 1A in the form of a honeycomb body.

FIG. 1B is a diagram illustrating a step for producing the metallic carrier 3 of FIG. 1A as a honeycomb body 7. The metallic carrier 3 is constituted as a honeycomb body 7 which is a laminate of metal foils obtained by placing a corrugated metal foil 4 (hereinafter referred to as corrugated foil 4) on a flat metal foil 5 (hereinafter referred to as flat foil 5), joining the ends thereof in the lengthwise direction, and winding the laminate of the corrugated foil 4 and the flat foil 5 outwardly from the center in a spiral form. FIG. 2 is a diagram illustrating the whole structure of the honeycomb body 7. The corrugated foil 4 and the flat foil 5 are usually made of a foil of an aluminum-containing iron-type alloy (e.g., 20% Cr-5% Al-75% Fe) or the like alloy having a thickness of about 50 $\mu$m.

Figure 1C:
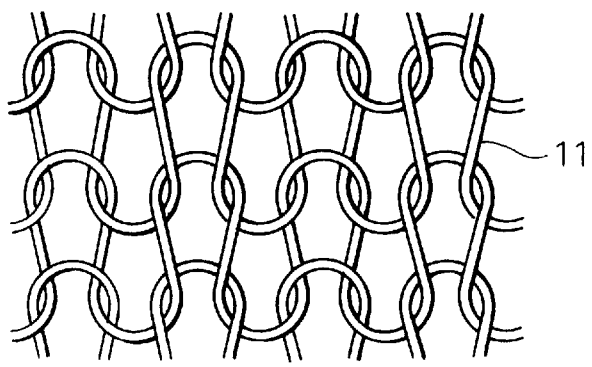
FIG. 1C is a view illustrating, on an enlarged scale, part of the cushioning material of FIG. 1A.

FIG. 1C is a diagram illustrating, on an enlarged scale, a portion of the cushioning material of FIG. 1A. The cushioning material 11 is constituted by molding, into a predetermined density using a press mold or the like, the aggregate of wire mesh obtained by circularly knitting, for example, fine heat-resistant metal wires (having a diameter of, for example, about 0.1 to about 0.5 mm). In this embodiment, the cushioning material 11 has a circular shape as shown in FIG. 2. The cushioning material 11 is so formed as to have a maximum diameter larger than the inner diameter of the casing 1 in a state where it is not receiving the external force and to have a minimum diameter smaller than the outer diameter of the metallic carrier 3. Upon receiving external force, the cushioning member 11 undergoes a deformation so that its maximum diameter and minimum diameter are changed.

To contain the thus constituted metallic carrier 3 in the casing 1 via the cushioning material 11, brazing material 13 such as nickel foil is locally wound on the outer periphery of the cylindrical cushioning material 11. In this embodiment, the brazing material 13 is wound on the central portion of the cushioning material 11. Brazing material 12 such as nickel foil is also wound on the outer periphery of the metal carrier 3. In this case, the position where the brazing material 12 is wound on the metallic carrier 3 is selected to not overlap the position of the brazing material 13 on the side of the cushioning material 11 when the cushioning material 11 is mounted on the metallic carrier 3. In this embodiment, the brazing material 12 is wound on an upper end portion and on a lower end portion of the cylindrical metal carrier 3.

Referring to FIG. 2, the cushioning material 11 and the metallic carrier 3 on which the brazing materials 12 and 13 are mounted, are inserted in the casing 1 in a manner that the inner periphery of the cushioning material 11 is expanded so that the cushioning material 11 is fitted to the outer periphery of the metallic carrier 3 and, then, the outer periphery of the cushioning material 11 comprising mesh-like wires 31 is contracted so as to be inserted in the casing 1. In a state where the metallic carrier 3 is contained in the casing 1 via the cushioning material 11, the cushioning material 11 is fitted in a compressed state between the casing 1 and the metallic carrier 3 as shown in FIG. 1A. In this state, the laser welding or the like welding is effected so that the casing 1 and the cushioning material 11 are joined together, and the cushioning material 11 and the metallic carrier 3 are joined together with the brazing materials 12 and 13.

In the thus constituted catalytic device 10 for cleaning exhaust gases of the embodiment, the wires of the wire gauze on the surfaces of the inner periphery and outer periphery of the cushioning material 11, the honeycomb body 7 and the outer cylinder 1, are joined together with the brazing materials, maintaining freedom for the fine wires in the cushioning material 11 and without impairing the role of the cushioning material 11. Every wire in the wire gauze-like cushioning material 11 undergoes deformation to absorb various thermal deformations inclusive of local deformations between the metallic carrier 3 and the outer cylinder 1 in the radial direction, in the circumferential direction and in the axial direction, and generation of thermal stress is suppressed among the metallic carrier 3, cushioning material 11 and outer cylinder 1. Since the cushioning material 11 has been compressed in advance, the junction portions accomplished by the brazing materials 12 and 13 are depressed by the repulsive force of the cushioning material 11, and the junction portions of the metallic carrier 3, cushioning material 11 and outer cylinder 1 exhibit increased junction force. The brazing materials 12 and 13 are locally arranged not to overlap one upon the other, and the metallic carrier 3, cushioning material 11 and outer cylinder 1 are joined together, providing large space for the metallic carrier 3 to escape when it is thermally deformed and decreasing the generation of thermal stress.

Since the rigidity of the cushioning material 11 can be set to be small with respect to the honeycomb body 7, the honeycomb body 7 is not deformed or does not generate stress when it is assembled being introduced into the outer cylinder 1 in a compressed state. Besides, the cushioning material 11 is allowed to have an increased compression margin, exhibits increased restoring force, and can be locally deformed. Accordingly, no high dimensional precision or no high precision in shape is required for the outer cylinder 1 and the honeycomb body 7.

Figure 3A:
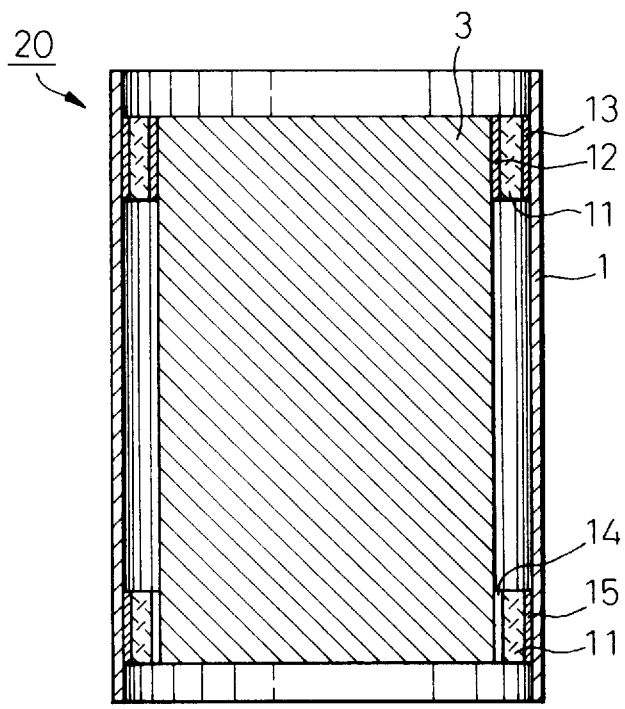
FIG. 3A is a sectional view of a catalytic device for cleaning exhaust gases of an internal combustion engine according to a second embodiment of the present invention.

FIG. 3A is a sectional view of a catalytic device 20 for cleaning exhaust gases of an internal combustion engine according to a second embodiment of the present invention, which is a modification from the catalytic device 10 for cleaning exhaust gases of the first embodiment. Therefore, the same constituent members as those of the catalytic device 10 for cleaning exhaust gases of the first embodiment are denoted by the same reference numerals.

In the catalytic device 20 for cleaning exhaust gases of the second embodiment, too, the metallic carrier 3 is contained in the cylindrical casing 1 which is the outer cylinder via the cushioning material 11. In the catalytic device 10 for cleaning exhaust gases of the first embodiment, the cushioning material 11 is provided over the full length of the metallic carrier 3. In the catalytic device 20 for cleaning exhaust gases of the second embodiment, however, the cushioning material 11 is provided only locally. In the second embodiment, the cushioning material 11 is provided only in a predetermined region near the upper end of the metallic carrier 3 and in a predetermined region near the lower end thereof.

The inner periphery of the cushioning material 11 on the side of the upper end of the metallic carrier 3 is entirely bonded with the brazing material 12 to the outer periphery of the metallic carrier 3, and the outer periphery of the cushioning material 11 is entirely bonded with the brazing material 13 to the inner periphery of the casing 1. The outer periphery of the cushioning material 11 on the side of the lower end of the metallic carrier 3 is entirely bonded with a brazing material 15 to the inner periphery of the casing 1, but the inner periphery of the cushioning material 11 on the side of the lower end is not bonded with the brazing material to the outer periphery of the metallic carrier 3. In FIG. 3A, space 14 is shown surrounding the outer periphery of the lower end of the metallic carrier 3. This, however, is to illustrate that no brazing material is used. In practice, therefore, no space exists.

Figure 4:
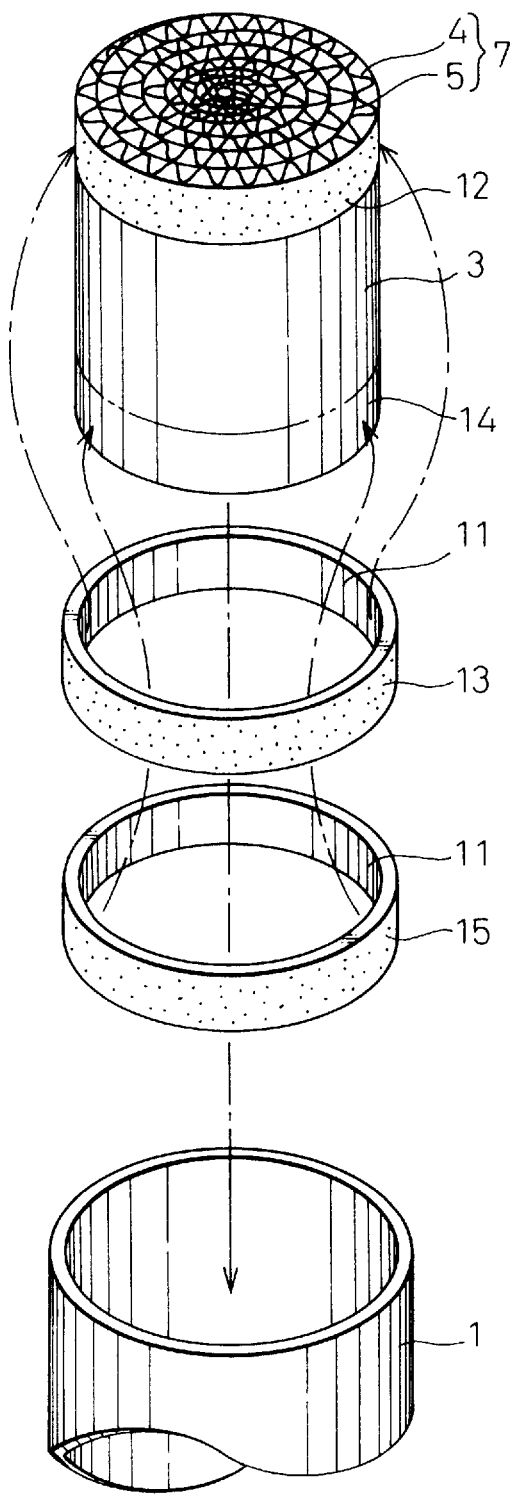
FIG. 4 is a perspective view of an assembly in which the metallic carrier is contained, via a cushioning material, in an outer cylinder of the catalytic device for cleaning exhaust gases of an internal combustion engine shown in FIGS. 3A and 3B.

The metallic carrier 3 comprises the honeycomb body 7 obtained by winding the corrugated foil 4 and the flat foil 5 laminated one upon the other in a spiral form in the same manner as in the first embodiment. FIG. 4 is a diagram illustrating the whole structure of the honeycomb body 7. The cushioning material 11 is constituted by molding, into a predetermined density using a press mold or the like, the aggregate of metal wires in the same manner as in the first embodiment. In this embodiment, the cushioning material 11 has a ring-shape as shown in FIG. 4. In this embodiment, too, the cushioning material 11 is so molded as to have a maximum diameter larger than the inner diameter of the casing 1 and a minimum diameter smaller than the outer diameter of the metallic carrier 3 when it is not receiving the external force.

In order to contain the thus constituted metallic carrier 3 in the casing 1 via the cushioning material 11, brazing materials 13 and 15 such as nickel foils are wound on the outer peripheries of the two cylindrical cushioning materials 11, respectively. Furthermore, the brazing material 12 such as nickel foil is locally wound on the outer periphery on the side of the upper end of the metallic carrier 3 at only a position where the cushioning material 11 will be provided. On the other hand, no brazing material is wound on the outer periphery 14 on the side of the lower end of the metallic carrier 3 at a position where the cushioning material 11 will be provided.

Referring to FIG. 4, the cushioning material 11 is mounted with its inner periphery being expanded on the outer periphery on the side of the upper end of the metallic carrier 3 on which the brazing material 12 is mounted, and another cushioning material 11 is mounted with its inner periphery being expanded on the outer periphery on the side of the lower end of the metallic carrier 3 on which the brazing material 12 has not been mounted. Then, the outer periphery of the cushioning material 11 is contracted and is inserted in the casing 1. In a state where the metallic carrier 3 is contained in the casing 1 via the cushioning material 11, the cushioning material 11 is fitted in a compressed state between the casing 1 and the metallic carrier 3 as shown in FIG. 3A. The laser welding or the like welding is effected in this state so that the casing 1 and the cushioning material 11 are joined together and the cushioning material 11 and the metallic carrier 3 are joined together on the side of the upper end of the metallic carrier 3, and the casing 1 and the cushioning material 11 only are joined together on the side of the lower end of the metallic carrier 3 with the brazing materials 12, 13 and 15.

In the catalytic device 20 for cleaning exhaust gases of this embodiment constituted as described above, the metallic carrier 3 and the cushioning material 11 are joined together and the outer cylinder 1 and the cushioning material 11 are joined together with the brazing materials 12 and 13 on the side of the upper end of the metallic carrier 3. On the side of the lower end of the metallic carrier 3, on the other hand, the outer cylinder or casing 1 and the cushioning material 11 are joined together with the brazing material 15, but the cushioning material 11 and the metallic carrier 3 are not joined together. As a result, a large difference in the thermal expansion between the outer cylinder 1 and the metallic carrier 3 in the axial direction is absorbed owing to the slipping between the metallic carrier 3 and the cushioning material 11 irrespective of the cushioning material 11, and generation of thermal stress is avoided among the metallic carrier 3, cushioning material 11 and outer cylinder 1. The effect of the cushioning material 11 that is arranged in a compressed manner and the effect of the cushioning material 11 for absorbing local deformation in the radial direction and in the circumferential direction, are the same as those of the first embodiment.

In the embodiment of FIG. 3A, no junction is effected to the surface of the metallic carrier 3 on the side of the lower end thereof among four junction surfaces of the cushioning material 11, metallic carrier 3 and outer cylinder 1. However, the place of no junction is in no way limited to the surface of the metallic carrier 3 on the side of the lower end thereof, but may be any one of the above-mentioned four contacting surfaces.

Figure 3B:
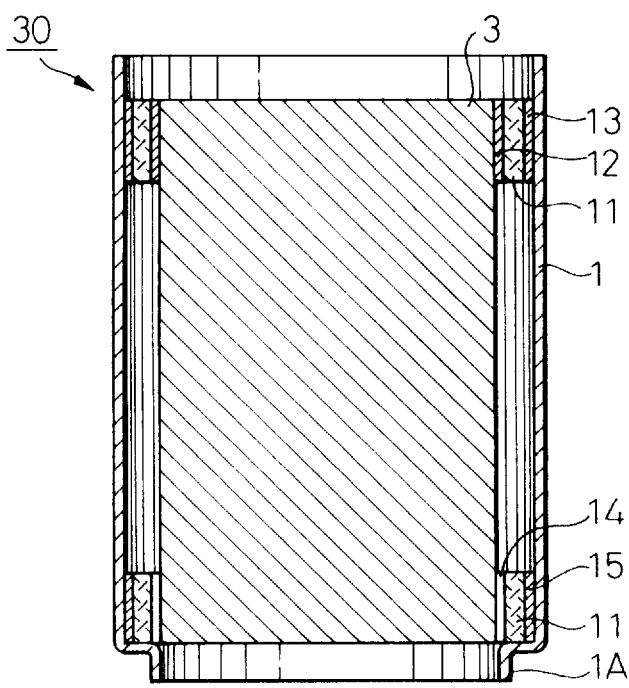
FIG. 3B is a sectional view of a catalytic device for cleaning exhaust gases of an internal combustion engine according to a third embodiment of the present invention.

FIG. 3B is a sectional view illustrating the constitution of a catalytic device 30 for cleaning exhaust gases according to a third embodiment of the present invention, which is a slight modification from the catalytic device 20 for cleaning exhaust gases of the second embodiment. Therefore, the same constituent members as those of the catalytic device 20 for cleaning exhaust gases of the second embodiment are denoted by the same reference numerals and their description is not repeated but different portions only are described.

The catalytic device 30 for cleaning exhaust gases of the third embodiment is different from the catalytic device 20 for cleaning exhaust gases of the second embodiment only in that a contracted-diameter portion 1A is formed at the lower end of the outer cylinder 1. The contracted-diameter portion 1A is provided at a portion on the downstream side of the outer cylinder 1 that is not overlapped on the metallic carrier 3. In this embodiment, the contracted-diameter portion 1A has an inner diameter slightly larger than the outer diameter of the metallic carrier 3. Therefore, even when the metallic carrier 3 undergoes the thermal expansion so that it is lengthened toward the downstream side of the exhaust gases, the elongated portion is contained in the contracted-diameter portion 1A.

In the catalytic device 30 for cleaning exhaust gases of the third embodiment, the position of the cushioning material 11 mounted on the side of the lower end of the metallic carrier 3 can be easily determined in addition to obtaining the effect of the catalytic device 20 for cleaning exhaust gases of the second embodiment.

Figure 5:
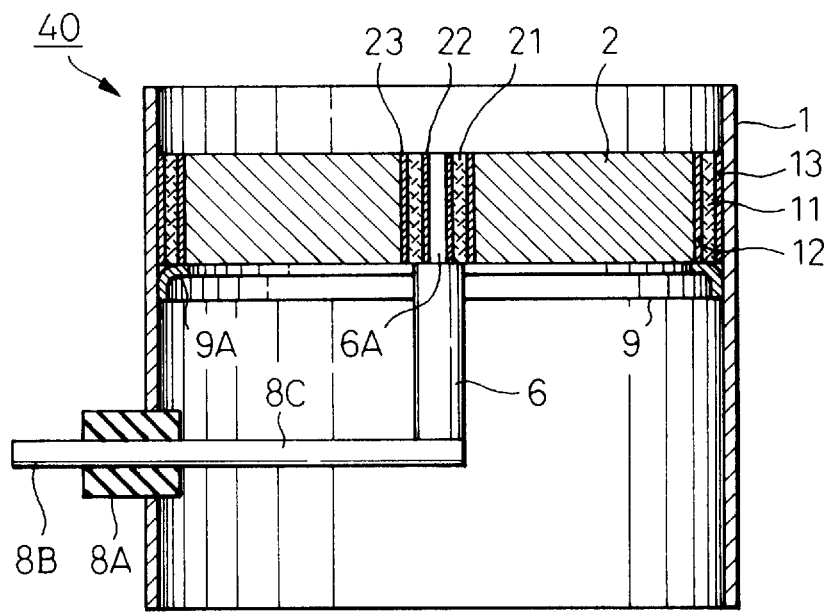
FIG. 5 is a sectional view illustrating the constitution of a catalytic device for cleaning exhaust gases of an internal combustion engine according to a fourth embodiment of the present invention.

FIG. 5 is a sectional view illustrating the constitution of a catalytic device 40 for cleaning exhaust gases of an internal combustion engine according to a fourth embodiment of the present invention, which is adapted to an electrically heated catalytic device. FIG. 7 is a perspective view of an assembly in which an electrically heated catalyst carrier 2 is contained in the outer cylinder 1 of the catalytic device 40 for cleaning exhaust gases of the fourth embodiment via a retainer 9 and a cushioning material 11.

In FIG. 5, reference numeral 1 denotes a metallic outer cylinder of the catalytic device 40 for cleaning exhaust gases. In the outer cylinder 1 is contained the electrically heated catalyst carrier 2 via the cushioning material 11. A center electrode 6 for supplying an electric current is inserted in a central portion of the electrically heated catalyst carrier 2. On the downstream side of the electrically heated catalyst carrier 2 is provided a retainer 9 that works as exhaust gas restriction means. The center electrode 6 of the side opposite to a narrow-diameter portion 6A is drawn to the external side of the outer cylinder 1 by a lead portion 8C through a holder 8A provided in the outer peripheral surface of the outer cylinder 1, and forms an external electrode 8B.

The electrically heated catalyst carrier 2 is constituted as the honeycomb body 7 comprising the corrugated foil 4 and the flat foil 5 like in the first embodiment. FIG. 7 is a diagram illustrating the whole constitution of the honeycomb body 7. The cushioning material 11 is constituted by molding, into a predetermined density using a press mold or the like, the aggregate of circularly knitted metal wires as in the first embodiment. In this embodiment, the cushioning material 11 has a ring-shape as shown in FIG. 7. In this embodiment, too, the cushioning material 11 is so formed as to have a maximum diameter larger than the inner diameter of the casing 1 and a minimum diameter smaller than the outer diameter of the electrically heated catalyst carrier 2 when it is not receiving the external force. A cushioning material 21 is formed in the same manner as the cushioning material 11, and has a maximum diameter larger than the inner diameter of a center hole 2A of the electrically heated catalyst carrier 2 and a minimum diameter smaller than the outer diameter of the narrow-diameter portion 6A of the center electrode 6 when it is not receiving the external force. The retainer 9 is made of a metal and has a cylindrical shape, and its upper end is inwardly folded by an equal distance to form a flange portion 9A. The flange portion 9A has a width nearly equal to the gap between the outer cylinder 1 and the electrically heated catalyst carrier 2.

The thus constituted electrically heated catalyst carrier 2 is contained in the casing 1 via the cushioning material 11 by winding foil-like brazing materials 13 and 23 on the whole outer peripheries of the ring-like cushioning materials 11, 21. Furthermore, the foil-like brazing material 12 is wound on the whole outer periphery of the electrically heated catalyst carrier 2. A brazing material 22 is also wound on the whole outer periphery of the narrow-diameter portion 6A of the center electrode 6. The narrow-diameter portion 6A of the center electrode 6 is inserted in the center hole 2A of the electrically heated catalyst carrier 2 with the cushioning material 21 being interposed therebetween, and the cushioning material 11 is fitted to the outer periphery of the electrically heated catalyst carrier 2. The retainer 9 is inserted in the outer cylinder 1 and, then, the electrically heated catalyst carrier 2 is inserted in the outer cylinder 1 so that the center electrode 6 comes into contact with the lead portion 8C, and the retainer 9 is mounted from the downstream side so as to come into contact with the electrically heated catalyst carrier 2.

In a state where the electrically heated catalyst carrier 2 is contained in the casing 1 via the cushioning material 11 through the step shown in FIG. 7, the cushioning material 11 is fitted in a compressed state between the casing 1 and the electrically heated catalyst 2, and the cushioning material 21 is fitted in a compressed state in a gap between the center hole 2A of the electrically heated catalyst carrier 2 and the outer periphery of the narrow-diameter portion 6A of the center electrode 6 as shown in FIG. 5. In this state, the laser welding or the like welding is effected so that the casing 1 and the cushioning material 11 are joined together, the cushioning material 11 and the electrically heated catalyst carrier 2 are joined together, the center hole 2A and the cushioning material 21 are joined together, and the cushioning material 21 and the narrow-diameter portion 6A of the center electrode 6 are joined together with the brazing materials 12, 13, 22 and 23.

The fundamental actions and effects of the cushioning materials 11 and 21 in the catalytic device 40 for cleaning exhaust gases of this embodiment are the same as the actions and effects of the catalytic devices 10, 20 and 30 for cleaning exhaust gases of the above-mentioned first to third embodiments.

The catalytic device 40 for cleaning exhaust gases of the fourth embodiment, on the other hand, is designed to be adapted to the electrically heated catalytic device and, hence, an electric current must be supplied thereto by applying a power source voltage across the center of the honeycomb body 7 and the outer cylinder 1. Therefore, the center electrode 6 provided at the center of the honeycomb body 7 and the outer cylinder 1 must be electrically and completely joined to each other. Therefore, the junction by using metallic brazing materials on the inner and outer peripheries of the cushioning materials 11 and 21 is an essential requirement. In the fourth embodiment, the honeycomb body 7 has a short overall length as shown in FIG. 5. Therefore, the end on the downstream side of the cushioning material 11 is closed by the flange portion 9A of the retainer 9 so that uncleaned exhaust gases will not flow through the cushioning materials 11 and 21, and the end on the downstream side of the cushioning material 21 is closed by a stepped portion relative to the narrow-diameter portion 6A of the center electrode 6. As a result, leakage of uncleaned exhaust gases is prevented, emission is not deteriorated, and the cushioning materials 11 and 21 are not deteriorated by high temperatures. When the honeycomb body 7 has a short overall length, the junction strength between the cushioning material 11 and the outer cylinder 1 relying upon the brazing materials 12 and 13 may not be large, but the strength is compensated by the stepped portion of the retainer 9 relative to the narrow-diameter portion 6A of the center electrode 6, and the electrically heated catalyst carrier 2 is prevented from being deviated by the exhaust gas pressure.

Figure 6:
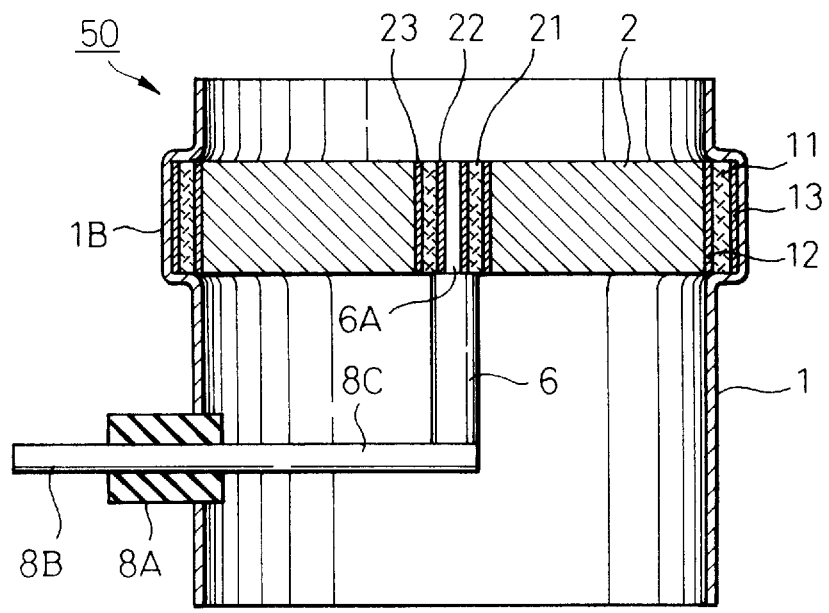
FIG. 6 is a sectional view illustrating the constitution of a catalytic device for cleaning exhaust gases of an internal combustion engine according to a fifth embodiment of the present invention.

FIG. 6 is a sectional view illustrating the constitution of a catalytic device 50 for cleaning exhaust gases according to a fifth embodiment of the present invention, which is slightly modified from the catalytic device 40 for cleaning exhaust gases of the fourth embodiment. Therefore, the same constituent members as those of the catalytic device 40 for cleaning exhaust gases of the second embodiment are denoted by the same reference numerals and their description is not repeated but different portions only are described.

The catalytic device 50 for cleaning exhaust gases of the fifth embodiment is different from the catalytic device 40 for cleaning exhaust gases of the fourth embodiment only in that the outer cylinder 1 is provided with an expanded-diameter portion 1B instead of the retainer 9 which is an exhaust gas restriction means. The expanded-diameter portion 1B is formed on the outer side of the electrically heated catalyst carrier 2 that is contained in the outer cylinder 1, and has space for containing the cushioning material 11 mounted on the outer periphery of the electrically heated catalyst carrier 2.

In this embodiment, the cushioning material 11 contained in the enlarged-diameter portion 1B has an outer diameter which is larger than the inner diameter of the enlarged-diameter portion 1B and has an inner diameter which is smaller than the outer diameter of the electrically heated catalyst carrier 2. To constitute the catalytic device 50 for cleaning exhaust gases of the fifth embodiment, therefore, the cushioning material 11 is fitted to the enlarged-diameter portion 1B and, then, the electrically heated catalyst carrier 2 is fitted by expanding the inner periphery of the cushioning material 11. This state is shown in FIG. 6 where the cushioning material 11 is contained in the enlarged-diameter portion 1B in a compressed manner.

The catalytic device 50 for cleaning exhaust gases of the fifth embodiment has a structure which permits little exhaust gas to infiltrate into the expanded-diameter portion 1B, preventing the exhaust gases from leaking toward the downstream side, preventing carbon and the like contained in the exhaust gases from infiltrating into the expanded-diameter portion 1B, and without causing the cushioning material 11 to be loaded in addition to obtaining the effects exhibited by the catalytic device 40 for cleaning exhaust gases of the fourth embodiment.

In the catalytic devices 40, 50 for cleaning exhaust gases of the fourth and fifth embodiments, the center electrode 6 is provided with a narrow-diameter portion 6A which is surrounded by the cushioning material 21 and is connected to the electrically heated catalyst carrier 2. The narrow-diameter portion 6A, however, needs not be surrounded by the cushioning material 21. The retainer 9 and the expanded-diameter portion 1B of the catalytic devices 40, 50 for cleaning exhaust gases of the fourth and fifth embodiments can also be applied to the catalytic devices 10, 20, 30 for cleaning exhaust gases of the first to third embodiments.

In the catalytic devices 10, 20 and 30 for cleaning exhaust gases of the first to third embodiments, the cushioning material 11 is constituted by heat-resistant metal wires. Here, however, no consideration is required concerning the directivity of the metal wires. As shown on an enlarged scale in FIG. 2, therefore, no problem exists even when the circularly knitted metal wires 31 extend in the circumferential direction of the cushioning material 11.

Considered below is a case where the cushioning material 11 in which the circularly knitted metal wires 31 are extending in the circumferential direction of the cylindrical cushioning material 11 as in FIG. 2 is mounted on the electrically heated catalyst carrier 2 in the catalytic devices 40, 50 for cleaning exhaust gases of the fourth and fifth embodiments. In this case, the cushioning material 11 is constituted by a laminate of a plurality of metal wires 31 that are continuous in the circumferential direction.

Therefore, the electric current flows from the electrically heated catalyst carrier 2 toward the outer cylinder 1 through a plurality of metal wires 31 that are laminated in the cushioning material 11 and are contacting to each other. Here, no problem arises when the plurality of metal wires 31 laminated in the radial direction of the electrically heated catalyst carrier 2 are electrically conductive to each other through the contacting portions.

As the cushioning material 11 is used in the exhaust gases, however, an oxide film is formed on the surfaces of the metal wires 31, whereby contact resistance increases among the metal wires 31, a decreased amount of electric current flows from the electrically heated catalyst carrier 2 toward the outer cylinder 1 through the plurality of metal wires 31, and the electrically heated catalyst carrier 2 is supplied with a decreased amount of electric power and is less heated.

As shown on an enlarged scale in FIG. 7, therefore, the cushioning material 11 mounted on the electrically heated catalyst carrier 2 is so constituted that the circularly knitted metal wires 31 extend in the axial direction of the cylindrical cushioning material 11. Then, at least some of the metal wires 31 are arranged as continuous wires connecting the inner peripheral surface on the side of the electrically heated catalyst carrier 2 to the outer peripheral surface on the side of the outer cylinder 1. The metal wires 31 that are continuous from the inner peripheral surface to the outer peripheral surface of the cushioning material 11 are homogeneously arranged over the whole circumference of the cushioning material 11.

Described below is a method of obtaining a cushioning material 11 by using metal wires 31 which are continuous from the inner peripheral surface to the outer peripheral surface of the cushioning material 11.

FIG. 8 is a plan view illustrating a state of before working a heat-resistant wire gauze 32 which is used for producing the cushioning material 11 shown in FIG. 7. The wire gauze 32 is formed by circularly knitting the metal wires 31. In FIG. 8, the circularly knitted metal wires 31, one of which is hatched, extend in a direction at right angles to the lengthwise direction of the wire gauze 32.

Figure 9A:
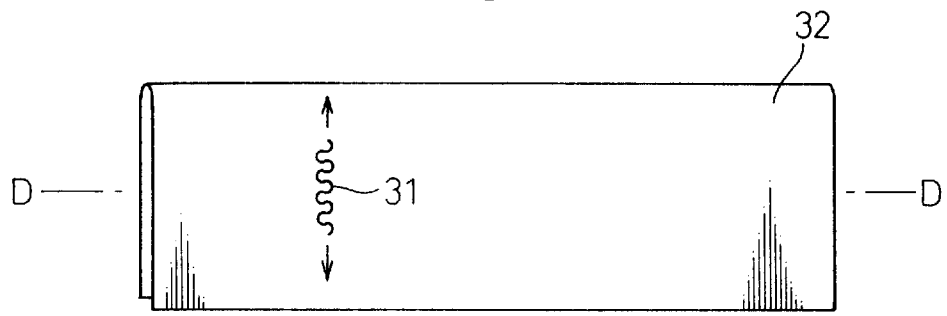
FIG. 9A is a perspective view illustrating a state where the heat-resistant wire gauze of FIG. 8 is folded along the line C—C.
Figure 9B:
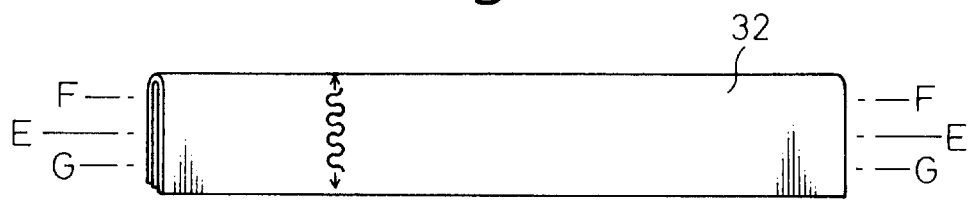
FIG. 9B is a perspective view illustrating a state where the heat-resistant wire gauze of FIG. 9A is folded along the line D—D.

In a first working method, the heat-resistant wire gauze 32 of FIG. 8 is folded into two along the line C—C. This state is shown in FIG. 9A in which the metal wires 31 in the wire gauze 32 are continuous on the front and back of the folded portion. The heat-resistant wire gauze 32 folded into two is further folded into two along the line D—D. This state is shown in FIG. 9B in which the metal wires 31 are continuous on the front and back of the folded portion.

Figure 9C:
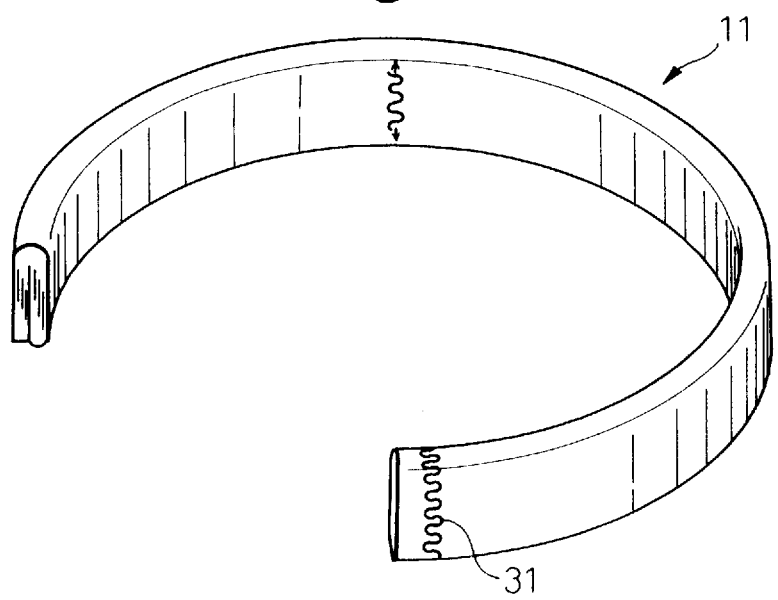
FIG. 9C is a partly cut-away perspective view of a cushioning material obtained by folding the heat-resistant wire gauze of FIG. 9 along the line E—E and, then, forming it in an annular shape.

The wire gauze 32 folded a plural number of times up to about one-half the required thickness is further folded into two to form the cushioning material 11. To simplify the description, it is now presumed that the state of FIG. 9B represents about one-half the thickness required for the cushioning material 11. The heat-resistant wire gauze 32 in the state of FIG. 9B is further folded in a U-shape along the line E—E, and is worked into an annular shape to form the cushioning material 11. This state is shown in FIG. 9C where the cushioning material 11 is the same as the cushioning material 11 shown in FIG. 7. In the cushioning material 11 of FIG. 9C, each metal wire 31 is continuous from the inner peripheral surface to the outer peripheral surface of the annular cushioning material 11.

Figure 10A:
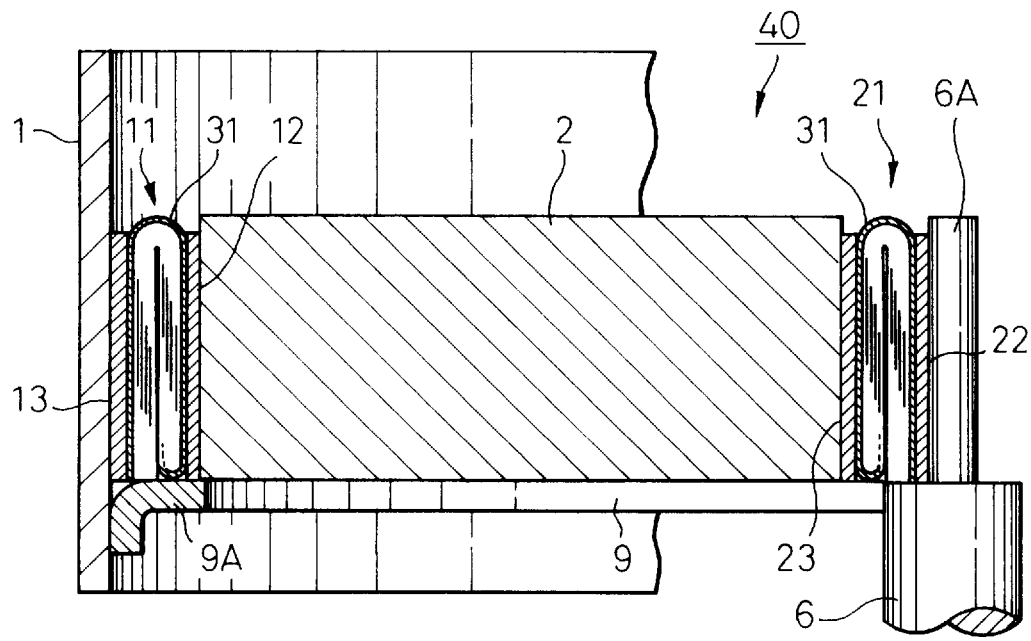
FIG. 10A is a sectional view illustrating, on an enlarged scale, part of the catalytic device for cleaning exhaust gases of an internal combustion engine shown in FIG. 5 by using the cushioning material constituted as shown in FIG. 9C.

FIG. 10A is a diagram illustrating, on an enlarged scale, part of the catalytic device 40 for cleaning exhaust gases shown in FIG. 5 by using the cushioning material 11 of the state of FIG. 9C as the cushioning material 11 and as the cushioning material 21, and wherein the same constituent members are denoted by the same reference numerals.

In FIG. 10A, therefore, reference numeral 1 denotes the outer cylinder, 2 denotes the electrically heated catalyst carrier, 6 denotes the center electrode for supplying electric current, 6A denotes the narrow-diameter portion of the center electrode 6, reference numeral 9 denotes the retainer, 9A denotes the flange portion, 11 and 21 denote cushioning materials, and 12, 13, 22 and 23 denote brazing materials. In a state where the cushioning materials 11 and 21 constituted as shown in FIG. 9C are inserted between the outer cylinder 1 and the electrically heated catalyst carrier 2 and between the electrically heated catalyst carrier 2 and the narrow-diameter portion 6A of the center electrode 6, the metal wires 31 constituting the cushioning materials 11 and 21 are arranged being continuous from the inner peripheral surfaces to the outer peripheral surfaces of the cushioning materials 11 and 21.

The metal wires 31 of the cushioning material 11 are electrically connected to the outer cylinder 1 with the brazing material 13, and are electrically connected to the outer peripheral surface of the electrically heated catalyst carrier 2 with the brazing material 12. The metal wires 31 of the cushioning material 21 are electrically connected to the narrow-diameter portion 6A of the center electrode 6 with the brazing material 22 and are electrically connected to the inner peripheral surface of the electrically heated catalyst carrier 2 with the brazing material 23.

As a result, the outer cylinder 1 is electrically and directly connected to the outer peripheral surface of the electrically heated catalyst carrier 2 through the metal wires 31 that are continuous from the inner peripheral surface to the outer peripheral surface of the cushioning material 11, and the inner peripheral surface of the electrically heated catalyst carrier 2 is electrically and directly connected to the narrow-diameter portion 6A of the center electrode 6 through the metal wires 31 that are continuous from the inner peripheral surface to the outer peripheral surface of the cushioning material 21.

Figure 10B:
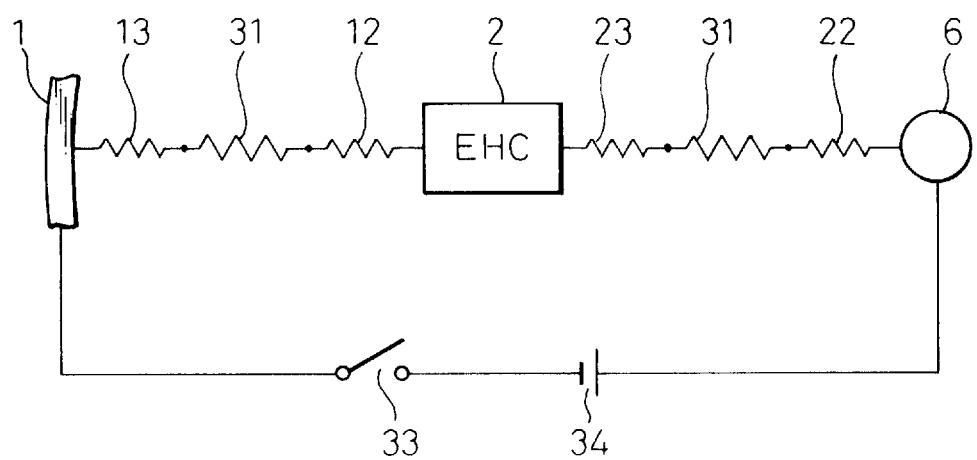
FIG. 10B is a diagram illustrating an electrically equivalent circuit of the catalytic device for cleaning exhaust gases of FIG. 10A.

FIG. 10B is a diagram illustrating an electrically equivalent circuit of the catalytic device 40 for cleaning exhaust gases of FIG. 10A. As will be understood from FIG. 10B, the center electrode 6 is connected to the electrically heated catalyst carrier (EHC) 2 through resistance of the brazing material 22, resistance of the metal wires 31 of the cushioning material 21 and resistance of the brazing material 23, and the electrically heated catalyst carrier 2 is electrically connected to the outer cylinder 1 through resistance of the brazing material 12, resistance of the metal wires 31 of the cushioning material 11 and resistance of the brazing material 13.

When a switch 33 is turned on at a moment when the electrically heated catalyst carrier 2 needs be heated, therefore, the electric current from a battery 34 flows from the center electrode 6 to the electrically heated catalyst carrier 2 through the metal wires 31 that are continuous from the inner peripheral surface to the outer peripheral surface of the cushioning material 21. After having heated the electrically heated catalyst 2, the electric current flows smoothly into the outer cylinder 1 through the metal wires 31 that are continuous from the inner peripheral surface to the outer peripheral surface of the cushioning material 11. Therefore, even when an oxide film is formed by exhaust gases on the surfaces of the metal wires 31 in the cushioning materials 11 and 21, the resistance remains unchanged between the center electrode 6 and the electrically heated catalyst carrier 2 and between the electrically heated catalyst carrier 2 and the outer cylinder 1, and performance for heating the electrically heated catalyst carrier 2 does not change.

Described below is a second working method. In the second working method, the wire gauze 32 is folded like in the first working method up to a step of FIG. 9B. The second working method is different from the first working method in that the wire gauze 32 in the state of FIG. 9B is folded in a U-shape at two places along the line F—F and the line G—G, and the wire gauze 32 as a whole is folded in a C-shape. Here, the state of FIG. 9B represents about one-half the thickness required for the cushioning material 11.

Figure 11:
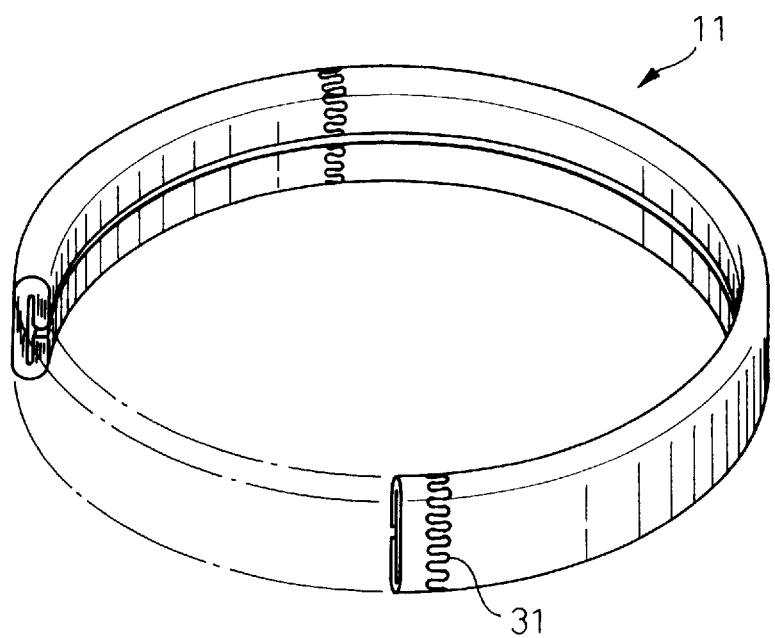
FIG. 11 is a partly cut-away perspective view of a cushioning material obtained by folding the heat-resistant wire gauze of FIG. 9B along the line F—F and the line G—G and, then, forming it in an annular shape.

When a wire gauze 32 in a state shown in FIG. 9B is folded in a U-shape at two places along the line F—F and the line G—G and is then worked into an annular shape, the cushioning material 11 is formed as shown in FIG. 11. This cushioning material 11 is the same as the cushioning material 11 shown in FIG. 7. In the cushioning material 11 explained with reference to FIG. 9C, each metal wire 31 is arranged as a U-shaped wire continuous from the inner peripheral surface to the outer peripheral surface of the annular cushioning material 11. In the annular cushioning material 11 formed as shown in FIG. 11, on the other hand, each metal wire 31 is arranged as a C-shaped wire continuous from the inner peripheral surface to the outer peripheral surface of the annular cushioning material 11.

That is, in the cushioning material 11 formed by the first working method, the inner peripheral surface and the outer peripheral surface of the cushioning material 11 are connected together through the metal wires 31 on the side of the upper end only. In the cushioning material 11 formed by the second working method, on the other hand, the inner peripheral surface and the outer peripheral surface of the cushioning material 11 are connected together through the metal wires 31 on both the side of the upper end and the side of the lower end. This is equivalent to that of when the inner peripheral surface and the outer peripheral surface of the cushioning material are connected together through the metal wires 31 of a number substantially twice as large.

Figure 12A:
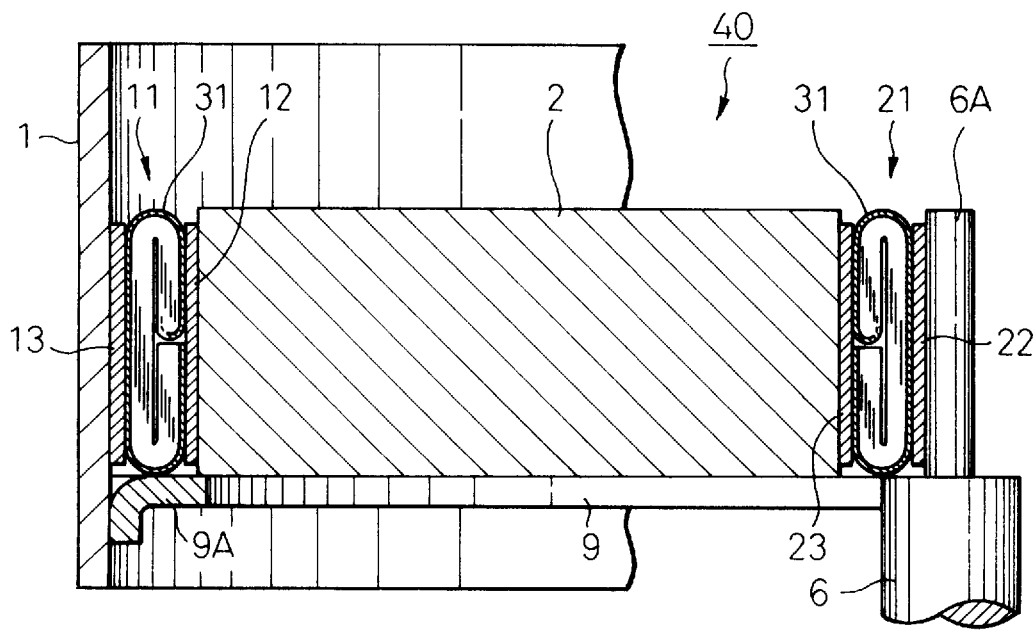
FIG. 12A is a sectional view illustrating, on an enlarged scale, part of the catalytic device for cleaning exhaust gases of an internal combustion engine shown in FIG. 5 by using the cushioning material constituted as shown in FIG. 11.

FIG. 12A is a diagram illustrating, on an enlarged scale, part of the catalytic device 40 for cleaning exhaust gases shown in FIG. 5 by using the cushioning material 11 of the state of FIG. 11 as the cushioning material 11 and as the cushioning material 21, and wherein the same constituent members are denoted by the same reference numerals.

In FIG. 12A, therefore, reference numeral 1 denotes the outer cylinder, 2 denotes the electrically heated catalyst carrier, 6 denotes the center electrode for supplying electric current, 6A denotes the narrow-diameter portion of the center electrode 6, reference numeral 9 denotes the retainer, 9A denotes the flange portion, 11 and 21 denote cushioning materials, and 12, 13, 22 and 23 denote brazing materials. In a state where the cushioning materials 11 and 21 constituted as shown in FIG. 11 are inserted between the outer cylinder 1 and the electrically heated catalyst carrier 2 and between the electrically heated catalyst carrier 2 and the narrow-diameter portion 6A of the center electrode 6, the metal wires 31 constituting the cushioning materials 11 and 21 are arranged being continuous from the inner peripheral surfaces to the outer peripheral surfaces of the cushioning materials 11 and 21.

The metal wires 31 of the cushioning material 11 are electrically connected to the outer cylinder 1 with the brazing material 13, and are electrically connected at two positions to the outer peripheral surface of the electrically heated catalyst carrier 2 with the brazing material 12. The metal wires 31 of the cushioning material 21 are electrically connected to the narrow-diameter portion 6A of the center electrode 6 with the brazing material 22 and are electrically connected at two positions to the inner peripheral surface of the electrically heated catalyst carrier 2 with the brazing material 23.

As a result, the outer cylinder 1 in FIG. 12A is electrically and directly connected to the outer peripheral surface of the electrically heated catalyst carrier 2 through the metal wires 31 of a number equivalently twice as large though the number of the metal wires continuous from the inner peripheral surface to the outer peripheral surface of the cushioning material 11 is the same as that of FIG. 11. Similarly, the inner peripheral surface of the electrically heated catalyst carrier 2 in FIG. 12A is electrically and directly connected to the narrow-diameter portion 6A of the center electrode 6 through the metal wires 31 of a number equivalently twice as large though the number of the metal wires 31 continuous from the inner peripheral surface to the outer peripheral surface of the cushioning material 21 is the same as that of FIG. 11.

Figure 12B:
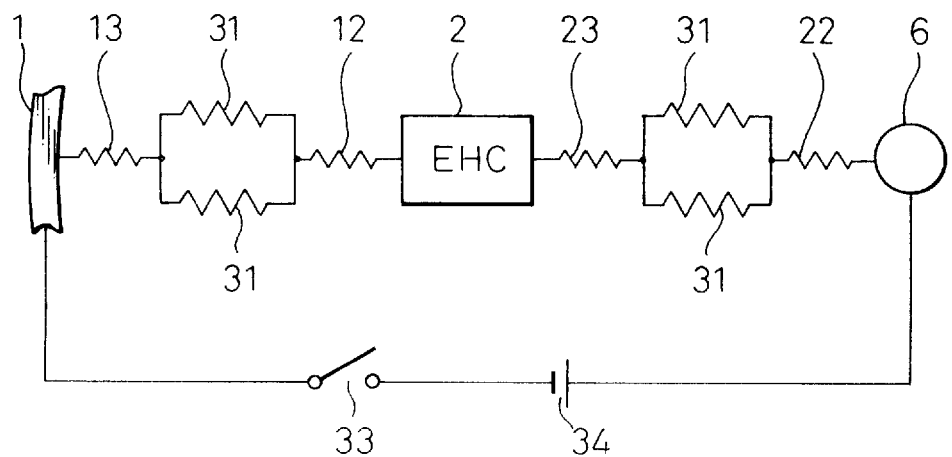
FIG. 12B is a diagram illustrating an electrically equivalent circuit of the catalytic device for cleaning exhaust gases of FIG. 12A.

FIG. 12B is a diagram illustrating an electrically equivalent circuit of the catalytic device 40 for cleaning exhaust gases of FIG. 12A. As will be understood from FIG. 12B, the center electrode 6 is connected to the electrically heated catalyst carrier (EHC) 2 through resistance of the brazing material 22, resistance of the metal wires 31 connected in parallel in the cushioning material 21 and resistance of the brazing material 23, and the electrically heated catalyst carrier 2 is electrically connected to the outer cylinder 1 through resistance of the brazing material 12, resistance of the metal wires 31 connected in parallel in the cushioning material 11 and resistance of the brazing material 13.

When the switch 33 is turned on at a moment when the electrically heated catalyst carrier 2 needs be heated, therefore, the electric current from the battery 34 flows from the center electrode 6 to the electrically heated catalyst carrier 2 through the metal wires 31 that are equivalently connected in parallel and are continuous from the inner peripheral surface to the outer peripheral surface of the cushioning material 21. After having heated the electrically heated catalyst 2, the electric current flows smoothly into the outer cylinder 1 through the metal wires 31 that are equivalently connected in parallel and are continuous from the inner peripheral surface to the outer peripheral surface of the cushioning material 11.

When the cushioning materials 11 and 21 formed by the second working method are used, therefore, there is no change in the resistance between the center electrode 6 and the electrically heated catalyst carrier 2 and in the resistance between the electrically heated catalyst carrier 2 and the outer cylinder 1, despite the oxide film due to the exhaust gases on the surfaces of the metal wires 31 in the cushioning materials 11 and 21, and there is no change in the performance for heating the electrically heated catalyst carrier 2. The cushioning materials 11 and 21 formed by the second working method have a resistance between the inner and outer peripheral surfaces, which is one-half that of the cushioning materials 11 and 21 formed by the first working method. Therefore, the resistance of the cushioning materials 11 and 21 can be decreased to improve heating performance of the electrically heated catalyst carrier 2. It is also made possible to prevent an increase in the resistance caused by a breakage of the metal wires 31.

Figure 13:
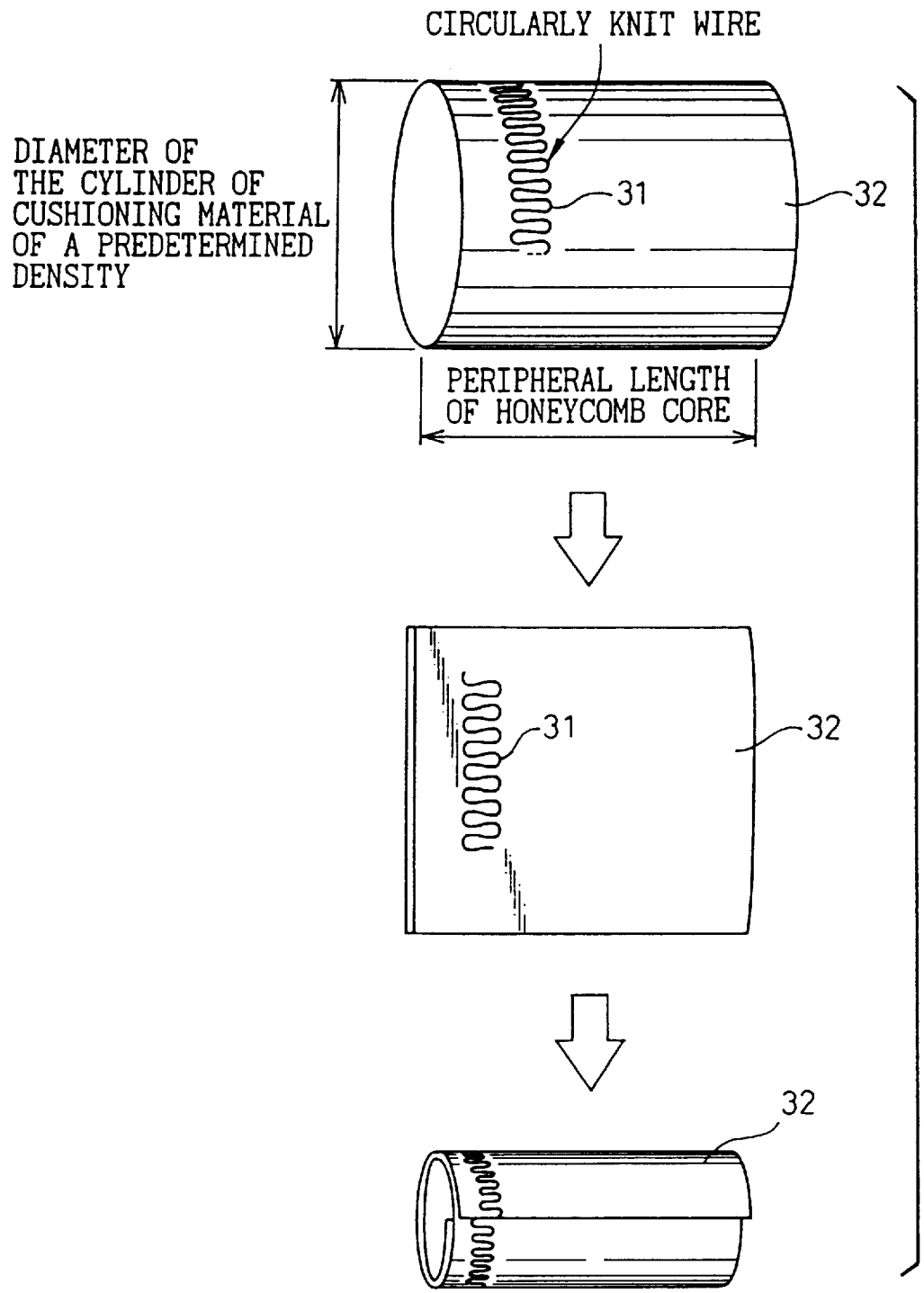
FIG. 13 is a diagram of steps illustrating another method of working a heat-resistant wire gauze used for forming the cushioning material of the fourth embodiment.

FIG. 13 is a diagram of steps illustrating another method of working the heat-resistant wire gauze 32 used for forming the cushioning materials 11 and 21 according to a fourth embodiment.

According to another method of working the heat-resistant wire gauze 32, the wire gauze 32 is formed in a cylindrical shape. The cylinder has a diameter within which the cushioning materials 11 and 21 that are formed have a predetermined density. The cylinder has an overall length equal to the overall length (peripheral length) of the honeycomb body 7. The metal wires 31 in the wire gauze 32 used in this working method are circularly knitted to be continuous in the circumferential direction of the cylinder.

The cylindrical wire gauze 32 is formed in the shape of a compressed double wire gauze 32 and is spirally wound. Here, if the spiral wire gauze 32 is compressed into the form of a strip in a manner that the final end of the spiral is at the center, the metal wires 31 connect the front of the strip-like wire gauze 32 to the back thereof passing through the upper and lower ends of the strip-like wire gauze 32, making it possible to obtain the same cushioning materials 11 and 21 as those obtained by the second working method.

In the aforementioned embodiments, the wire gauze 32 was constituted by the circularly knitted metal wires 31. However, there is no particular limitation on the method of knitting or weaving the wire gauze 32 provided the inner and outer peripheral surfaces of the obtained cushioning materials 11 and 21 are connected together through the metal wires 31 that are knitted or woven.

The aforementioned embodiments have dealt with the catalytic devices for cleaning exhaust gases containing the honeycomb body 7 obtained by spirally winding a laminate of a corrugated metal foil 4 and a flat metal foil 5. The honeycomb body 7 can further be formed in a cylindrical shape by folding a laminate of the corrugated metal foil 4 and the flat metal foil 5 in a zig-zag manner, and the present invention can be effectively adapted even to catalytic device for cleaning exhaust gases containing the honeycomb body of this type.

What is claimed is:

1. A catalytic device for cleaning exhaust gases, the catalytic device being installed in an exhaust gas passage of an internal combustion engine, comprising:

a metallic outer cylinder connected at an upstream inlet portion and a downstream outlet portion thereof to said exhaust gas passage;

a metallic catalyst carrier contained in said metallic outer cylinder wherein said metallic outer cylinder includes an external electrode to supply an electric current only to a central portion of said metallic catalyst carrier, and wherein said external electrode and said metallic outer cylinder are connected to a power source, so that said metallic catalyst carrie; works as an electrically heated catalyst carrier, a cushioning material made of a heat-resistant wire gauze arranged between said metallic outer cylinder and said metallic catalyst carrier; and junction materials for joining said cushioning material to said metallic catalyst carrier and for joining said cushioning material to said metallic outer cylinder, wherein said junction materials are electrically conducting brazing materials, said cushioning material is joined to said catalytic carrier and said metallic outer cylinder by brazing, and wherein said cushioning material is disposed in a compressed state between said metallic catalyst carrier and said metallic outer cylinder, wherein the wire gauze includes a plurality of continuous wires connecting an inner peripheral surface of said cushioning material adjacent to said metallic catalyst carrier to an outer peripheral surface thereof adjacent to said metallic outer cylinder, and wherein the continuous wires are substantially evenly arranged over an entire circumference of said cushioning material so that the inner peripheral surface of said cushioning material is electrically coupled to the outer peripheral surface of said cushioning material.

2. A catalytic device for cleaning exhaust gases according to claim 1, wherein a portion of an inner surface of said cushioning material is joined to a corresponding portion of an outer surface of said metallic catalyst carrier defining an inner bond portion, and wherein a portion of an outer surface of said cushioning material is joined to a corresponding portion of an inner surface of said metallic outer cylinder defining an outer bond portion.

3. A catalytic device for cleaning exhaust gases according to claim 2, wherein the metallic outer cylinder defines an axis and wherein said inner and outer bond portions are arranged so as not to be overlapped one upon another along the axis of the metallic outer cylinder.

4. A catalytic device for cleaning exhaust gases according to claim 1, wherein an exhaust gas restriction means for preventing the passage of exhaust gases between said metallic catalyst carrier and said metallic outer cylinder is provided at the downstream outlet portion thereof.

5. A catalytic device for cleaning exhaust gases according to claim 4, wherein said exhaust gas restriction means is a retainer which covers a downstream end portion of said cushioning material.

6. A catalytic device for cleaning exhaust gases according to claim 4, wherein said exhaust gas restriction means includes an enlarged-diameter portion formed by enlarging the diameter of said metallic outer cylinder to contain said cushioning material.

7. A catalytic device for cleaning exhaust gases according to claim 1, wherein at least one continuous wire extends from a first end portion to a second end portion and wherein the first and second end portions of the at least one continuous wire are both positioned on one of the inner peripheral surface and the outer peripheral surface of said cushioning material, and wherein a central portion of the at least one continuous wire is positioned on the other of the inner peripheral surface and the outer peripheral surface of said cushioning material.

* * * * *

UNITED STATES PATENT AND TRADEMARK OFFICE
CERTIFICATE OF CORRECTION

PATENT NO. : 5,851,496
DATED : December 22, 1998
INVENTOR(S) : Kazuhiro SAKURAI

It is certified that error appears in the above-identified patent and that said Letters Patent is hereby corrected as shown below:

Column 2, line 2, change "a difference" to --the difference-- and delete "the" before "thermal".

Column 2, line 39, insert a comma after "device".

Column 17, line 10, change "carrie;" to --carrier;--.

Signed and Sealed this

Twenty-eighth Day of November, 2000

Attest:

Q. TODD DICKINSON

Attesting Officer

Director of Patents and Trademarks